United States Patent [19]

Matsuoka

[11] Patent Number: 5,164,745
[45] Date of Patent: Nov. 17, 1992

[54] IMAGE FORMING APPARATUS HAVING LASER TIMING CONTROL USING BEAM DETECTION

[75] Inventor: Takashi Matsuoka, Yokohama, Japan

[73] Assignee: Kabushiki Kaisha Toshiba, Kawasaki, Japan

[21] Appl. No.: 605,684

[22] Filed: Oct. 30, 1990

[30] Foreign Application Priority Data

Oct. 31, 1989 [JP] Japan .................................. 1-283751

[51] Int. Cl.$^5$ ............................................. H04N 1/21
[52] U.S. Cl. .................................... 346/108; 358/296
[58] Field of Search ................ 346/108, 107 R, 76 L, 346/160; 358/296, 300, 302

[56] References Cited

U.S. PATENT DOCUMENTS

| | | | |
|---|---|---|---|
| 4,264,120 | 4/1981 | Uchiyama et al. | 350/6.8 |
| 4,853,710 | 8/1989 | Shimada et al. | 346/108 |
| 4,933,874 | 6/1990 | Asada et al. | 346/160 |

Primary Examiner—Mark J. Reinhart
Attorney, Agent, or Firm—Foley & Lardner

[57] ABSTRACT

A laser beam emitted from a laser is detected by a photosensor, and a flip-flop is preset by a detection signal output from the photosensor. A timer is driven in accordance with a preset output from the flip-flop, and a timer output is generated after a lapse of a predetermined period of time. The laser is again driven by the timer output to emit a laser beam. While, another timer is driven in response to a front edge of the preset output of the flip-flop to generate a horizontal synchronizing signal.

9 Claims, 16 Drawing Sheets

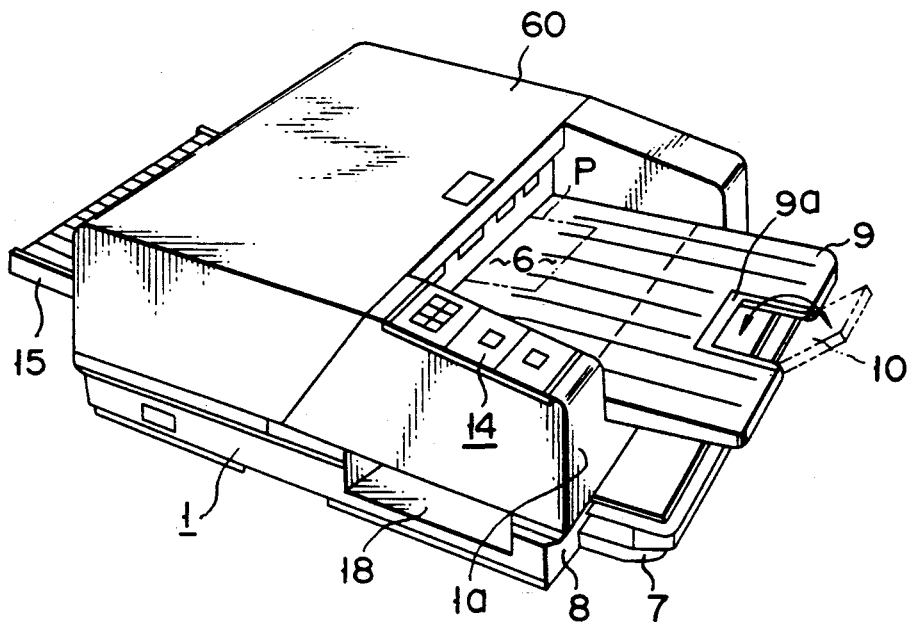
F I G. 1
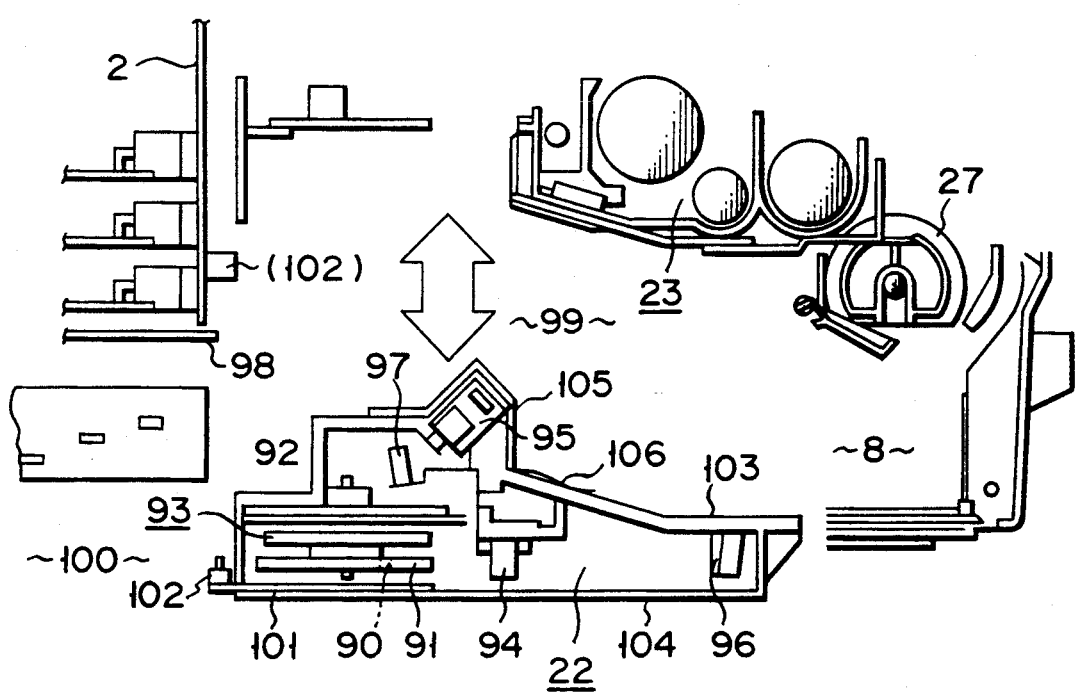
F I G. 3

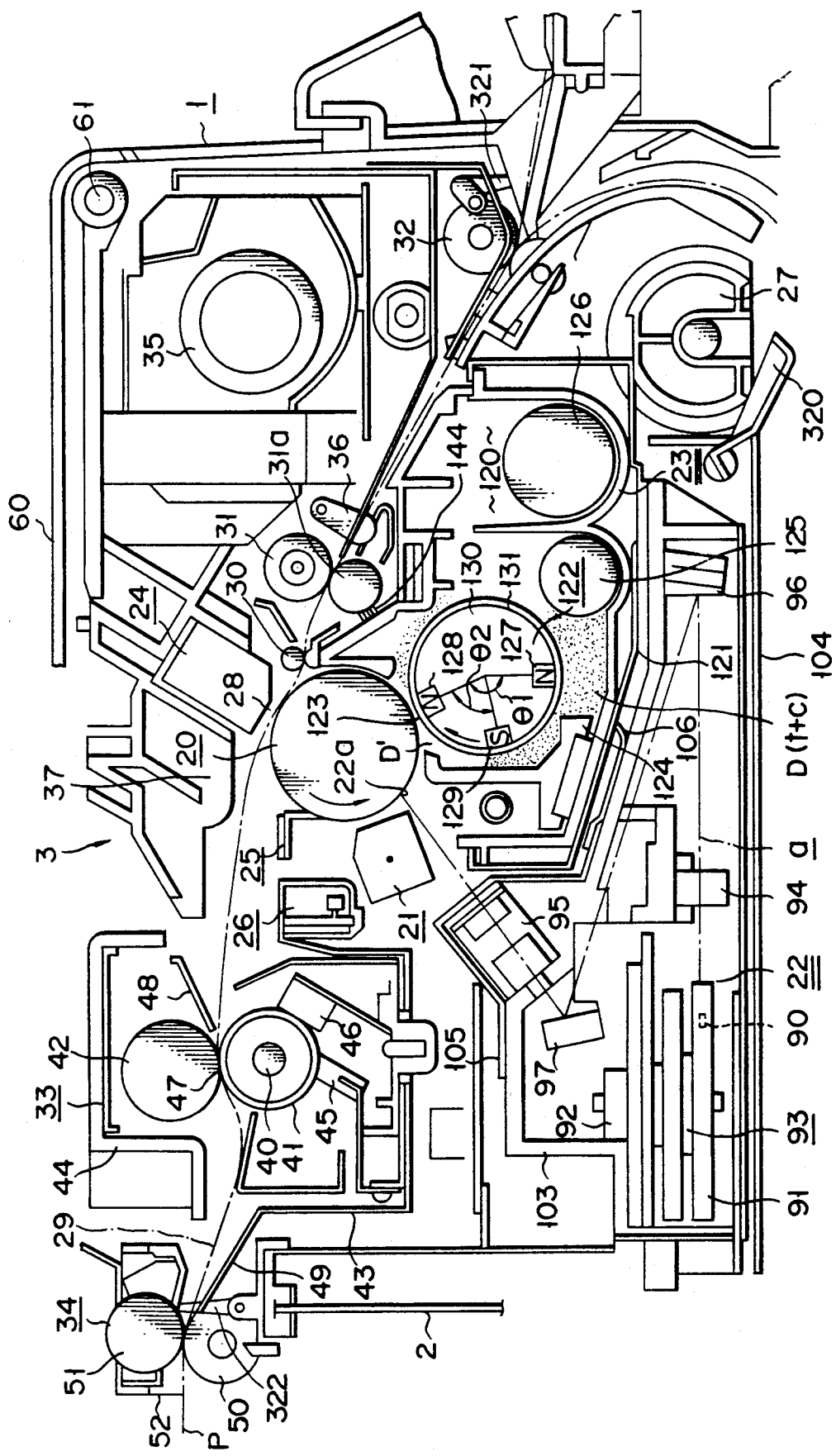
F I G. 2

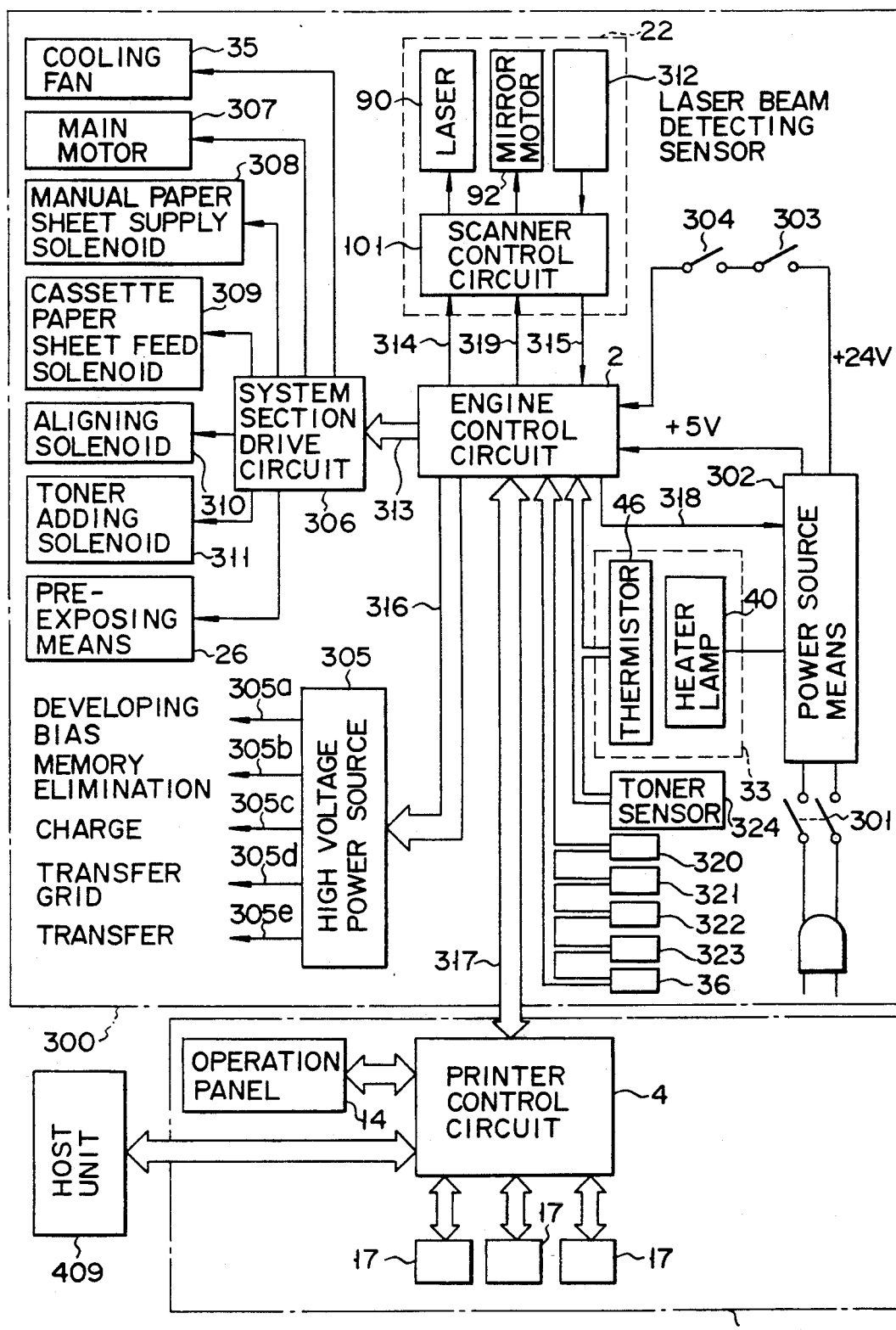
F I G. 4

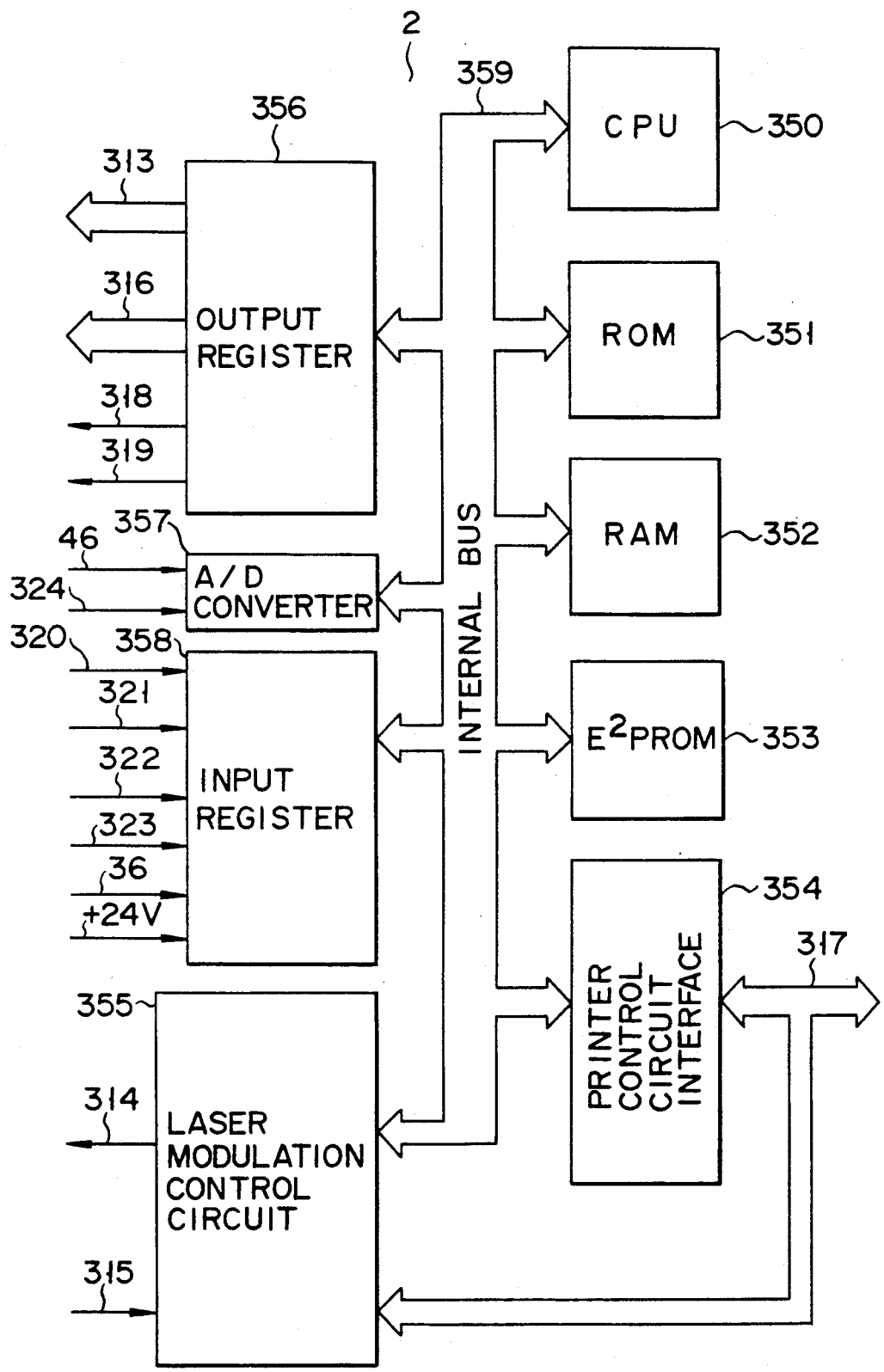
F I G. 5

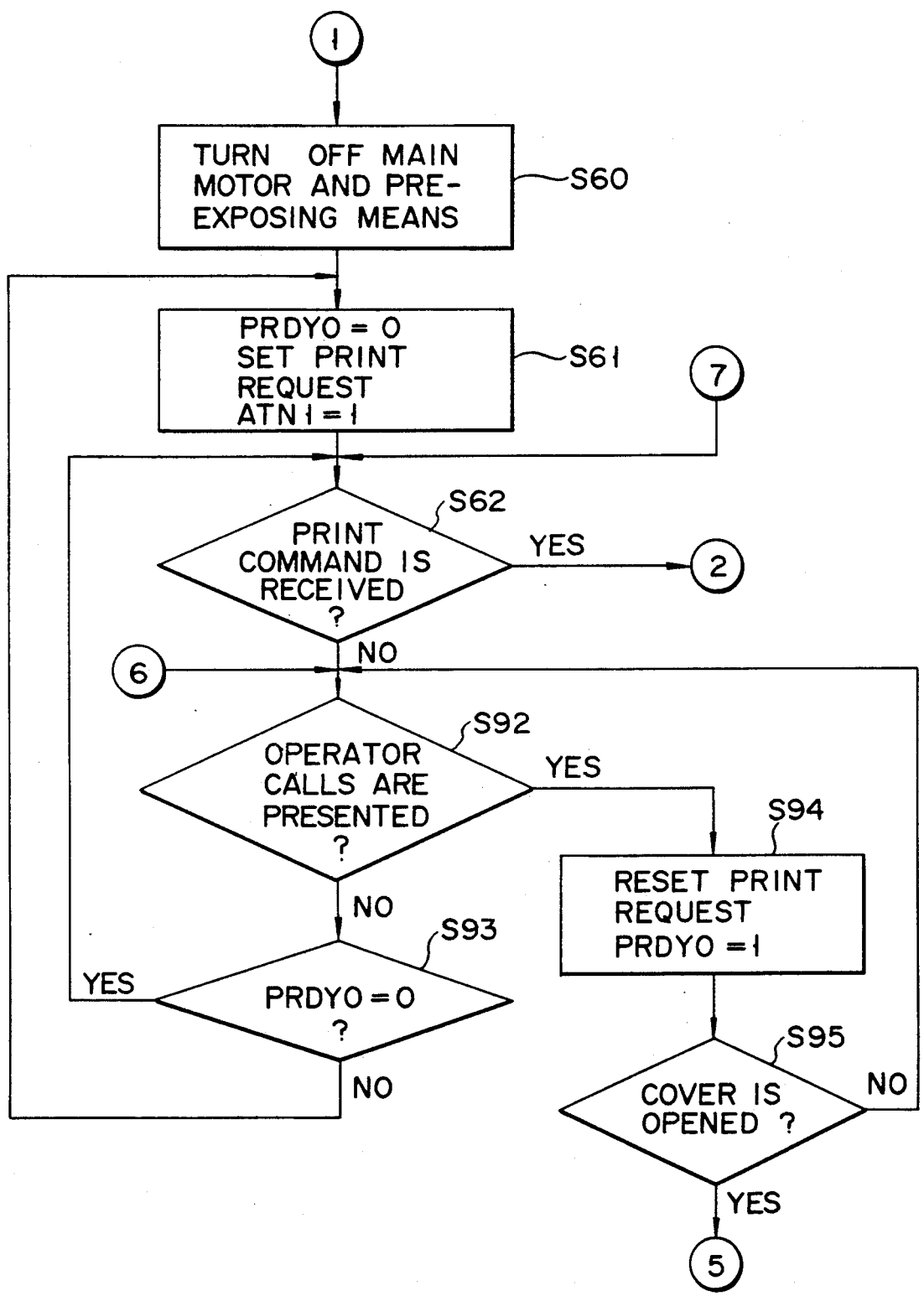
F I G. 6B

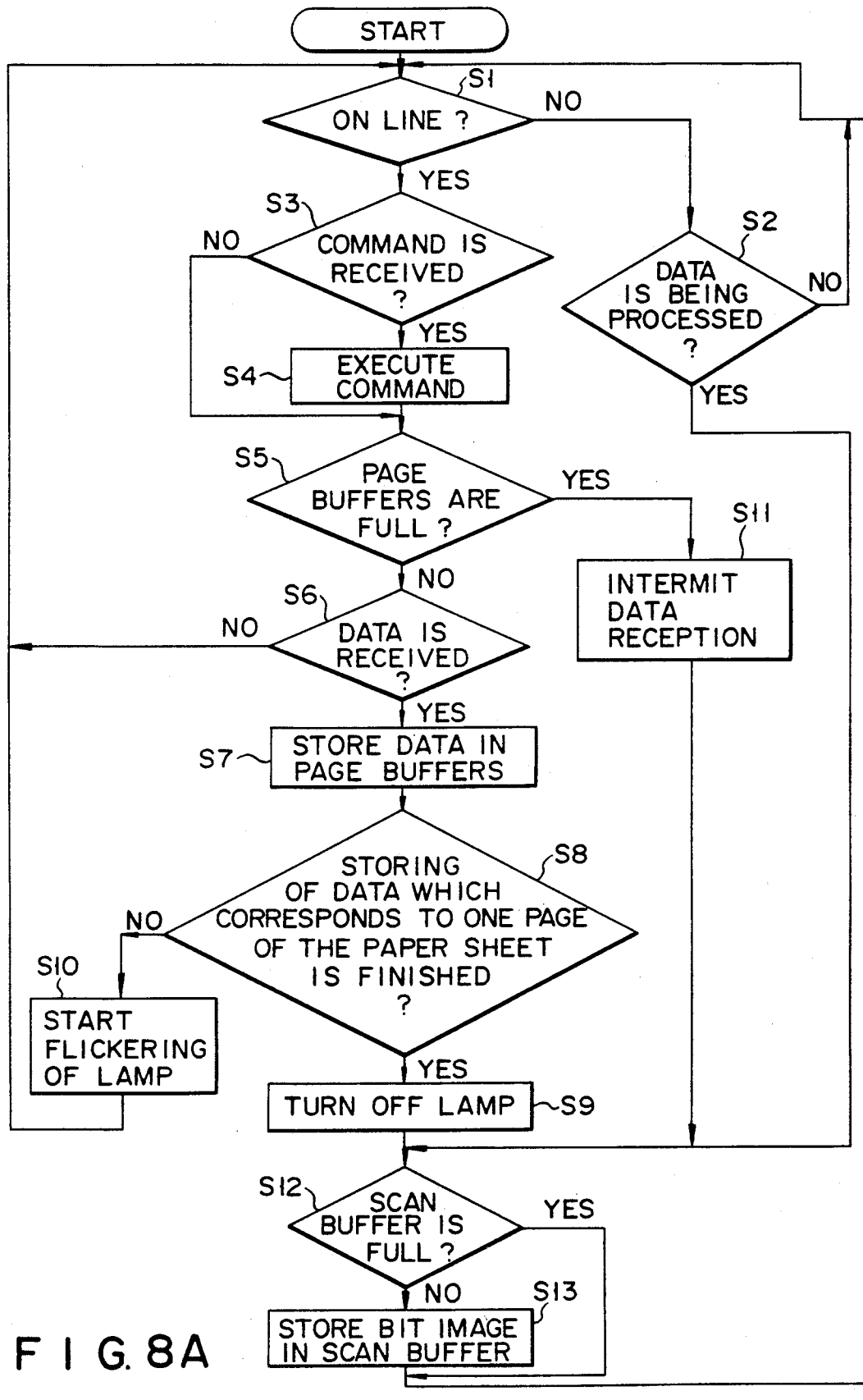
F I G. 8A

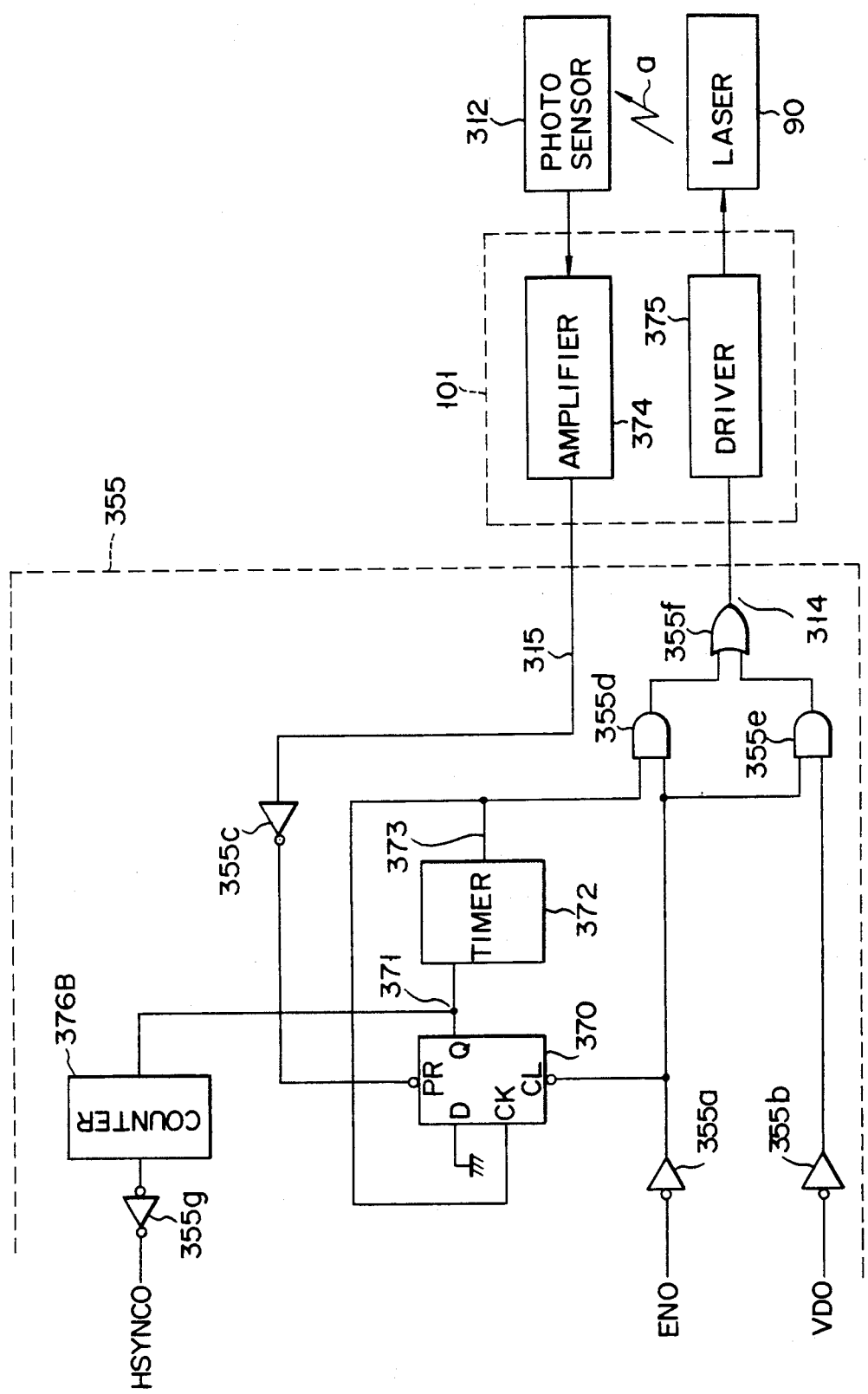
F I G. 12

IMAGE FORMING APPARATUS HAVING LASER TIMING CONTROL USING BEAM DETECTION

BACKGROUND OF THE INVENTION

1. Field of the Invention

The present invention relates to an image forming apparatus, such as a laser printer, for forming images by a laser beam responsive to image information applied from the host unit.

2. Description of the Related Art

In the case of the conventional laser provided in a laser printer, a laser beam detecting signal applied from a laser beam detecting sensor every time a horizontal scanning operation is carried out is used as a horizontal synchronizing signal, and a timer is made operative for a predetermined time period and synchronizes with the front edge of the laser beam detecting signal, while the output laser beam is turned off. When the operation of the timer is finished, the output laser beam is again turned on and a next laser beam detecting signal is again created.

Conventionally, the laser beam detecting signal is used directly as a trigger signal for starting the timer. In the case where the laser beam detecting sensor had stains and flaws on its light-receiving face, therefore, the waveform of the laser beam detecting signal is split to thereby generate two horizontal synchronizing signals, for example, at the time one scanning operation is finished.

Further, the output laser beam is turned off, synchronizing with the front edge of the laser beam detecting signal. Therefore, the width of the horizontal synchronizing signal became extremely narrow, like whiskers. When a signal transmitting line is long, therefore, the horizontal synchronizing signal is lost, because of electrostatic stray capacitance on the signal transmitting line.

SUMMARY OF THE INVENTION

The object of the present invention is therefore to provide an image forming apparatus using a laser beam and capable of obtaining stable horizontal synchronizing signal whose pulse width is usually kept certain.

This object of the present invention can be achieved by an image forming apparatus for forming images on an image forming medium by using a laser beam comprising: means for emitting laser beam; means for detecting the laser beam emitted from the emitting means to generate a detecting signal; means for generating a first pulse signal responsive to the detecting signal generated by the detecting means; and second means for generating a second pulse signal for a predetermined time period corresponding to a front edge of the first pulse signal generated by the first means.

According to the present invention, the second pulse signal is generated as a horizontal synchronizing signal within the predetermined time period since the front edge of the first pulse signal formed responsive to the laser beam detected by the above-mentioned means appears. This enables the horizontal synchronizing signal to have a stable pulse width without being influenced by a condition of the first pulse signal.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is a perspective view showing the appearance of an embodiment of the laser printer according to the present invention;

FIG. 2 is a side view showing an internal arrangement of the laser printer shown in FIG. 1;

FIG. 3 shows laser exposing means in FIG. 2 detachable from the printer body;

FIG. 4 is a block diagram showing the arrangement of a control system for the laser printer shown in FIG. 2;

FIG. 5 is a block diagram showing the arrangement of an engine control circuit shown in FIG. 4;

FIGS. 6A through 6E ar flow charts showing operations of an engine control section shown in FIG. 4;

FIGS. 8A and 8B show a flow chart showing an operation of a printer control circuit section shown in FIG. 4;

FIGS. 11 and 12 are block diagrams showing variations of the circuit shown in FIG. 9.

DETAILED DESCRIPTION OF THE PREFERRED EMBODIMENT

Figure 6A:
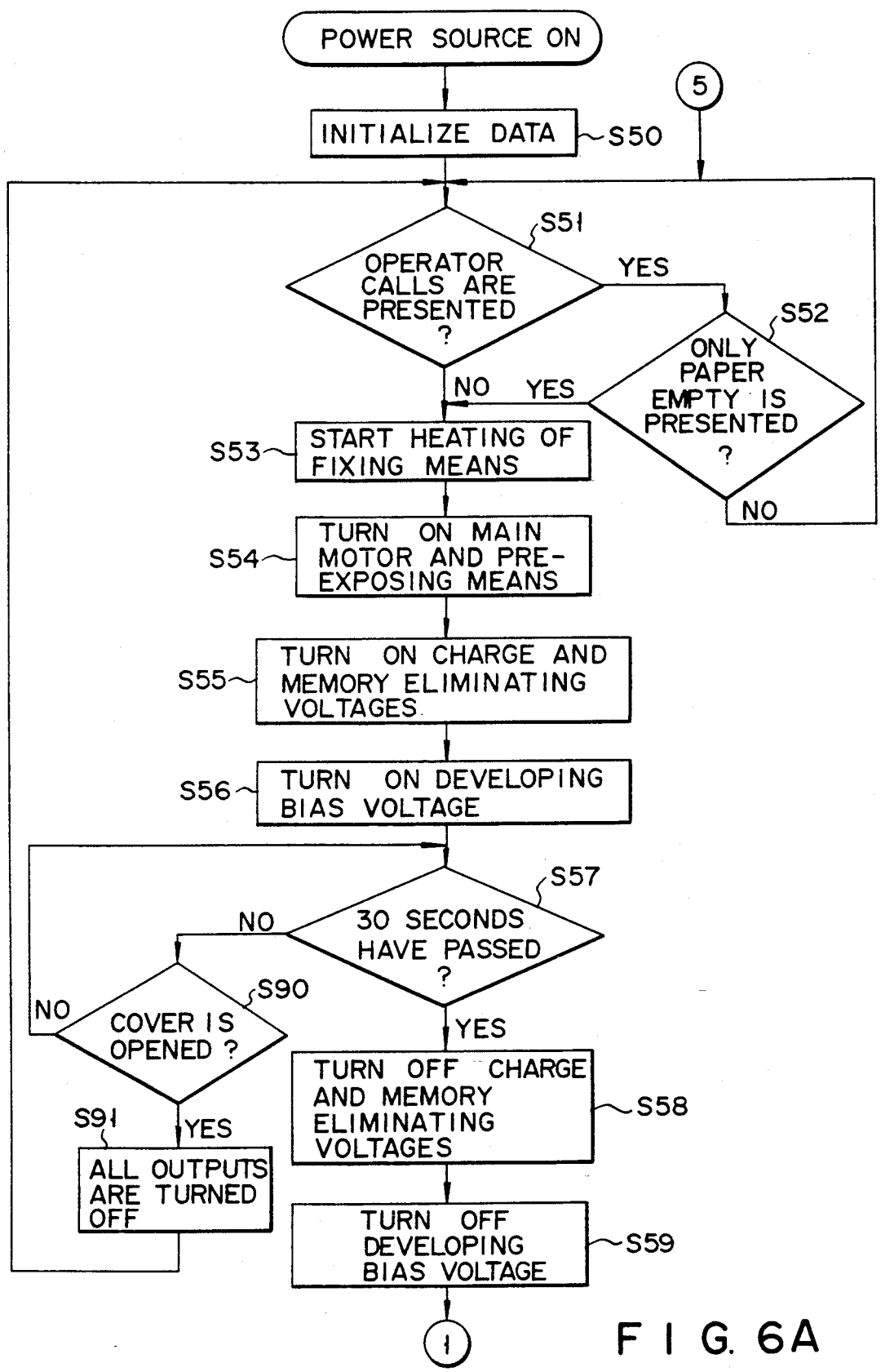
Figure 6C:
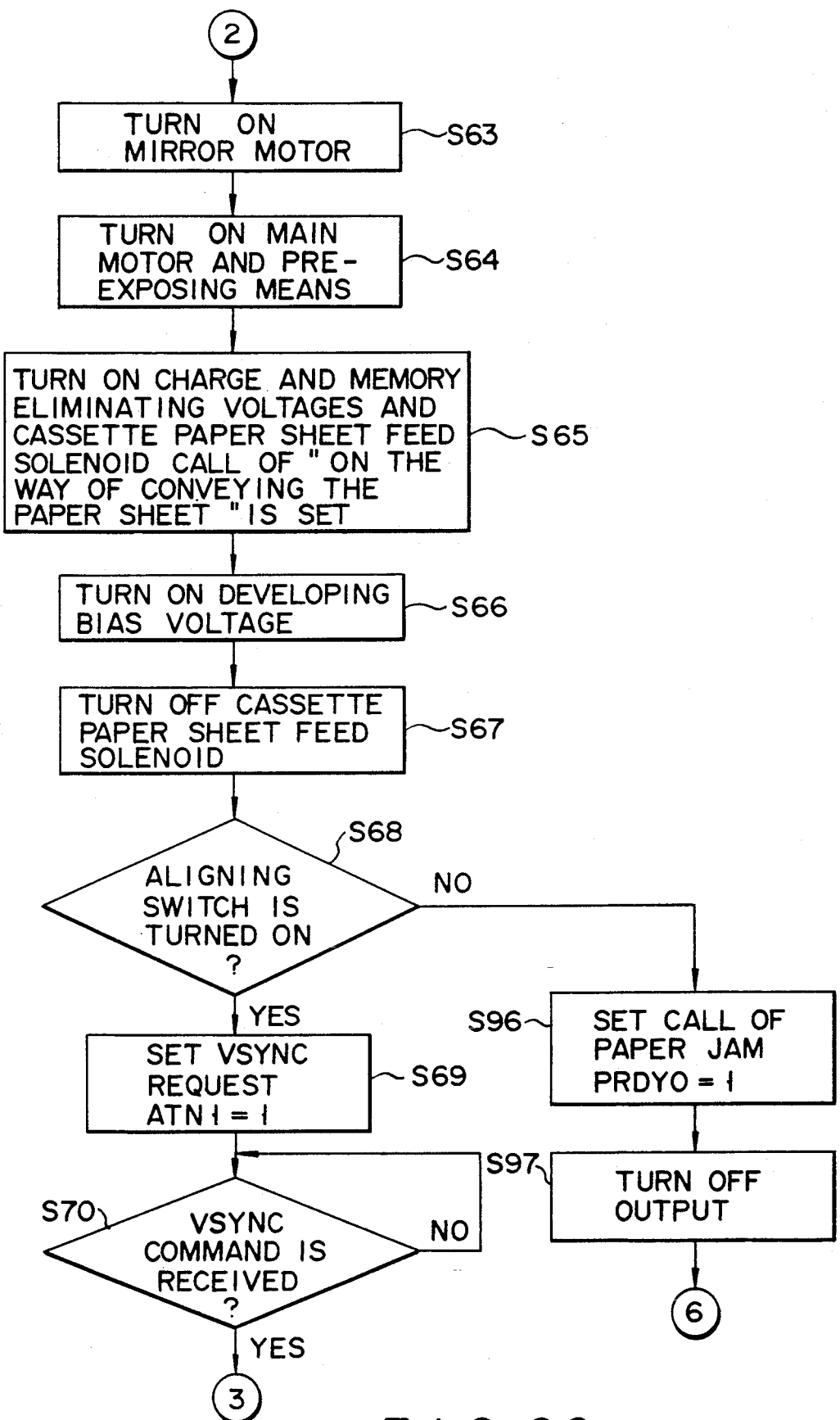
Figure 6D:
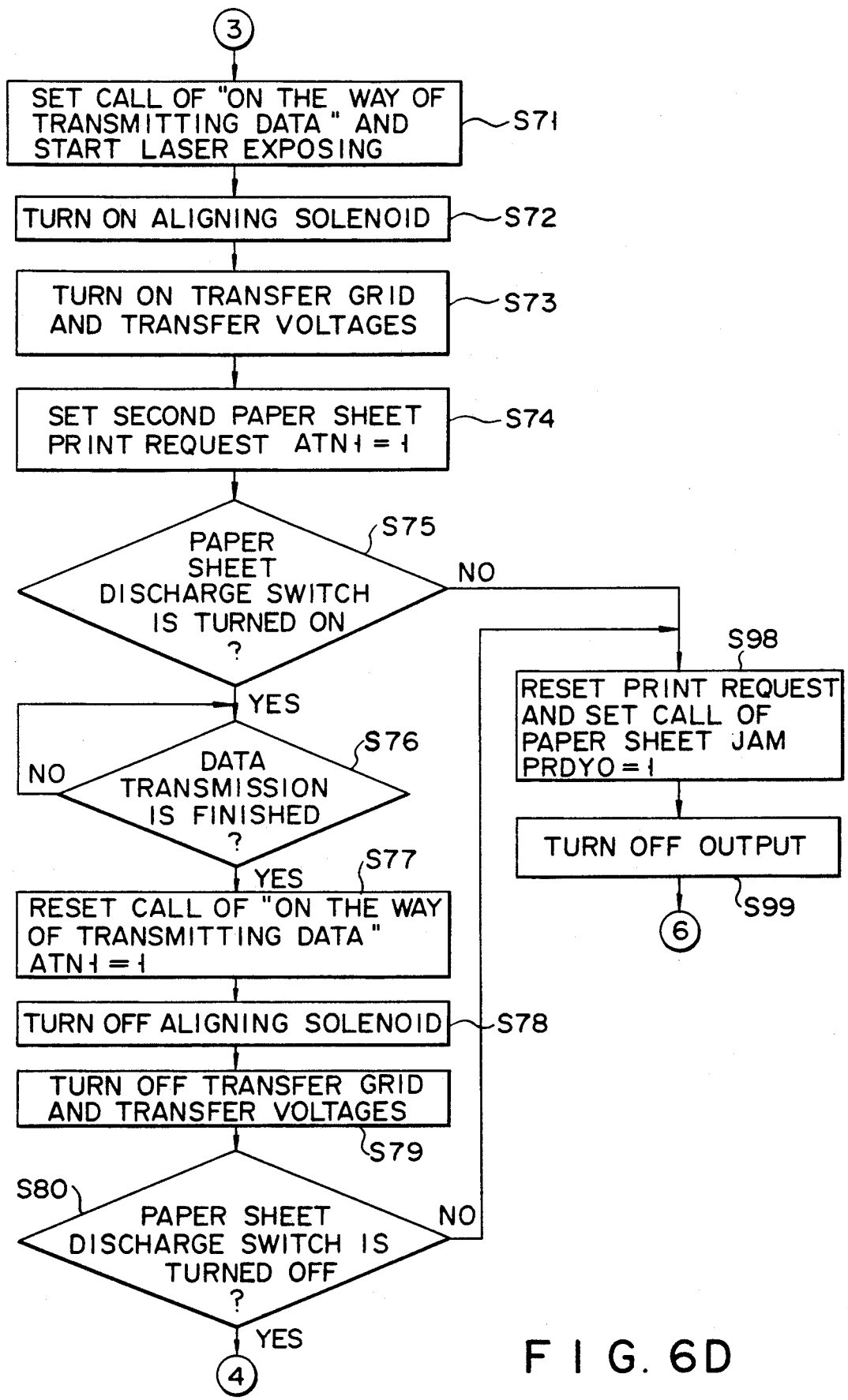
Figure 6E:
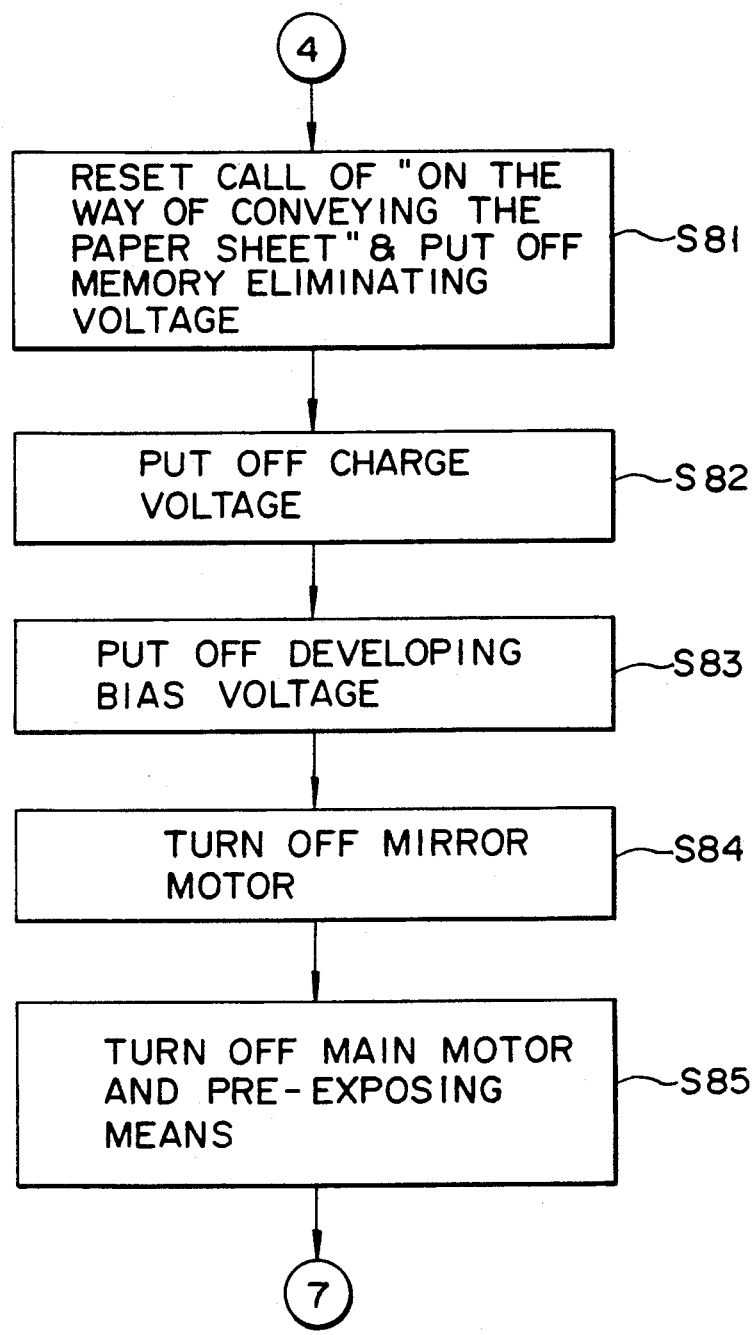

An embodiment of a laser printer to which the present invention has been applied will be described with reference to the accompanying drawings.

FIG. 1 shows an embodiment according to the present invention. The laser printer is covered by a housing body 1 and a recess, which serves as a paper sheet discharge area 6, is formed at the front top of the printer. A swingable paper discharge tray 9 which can be folded and expanded is arranged in the recess 6 and it is provided with a cut-away portion 9a at the front center thereof. A swingable U-shaped auxiliary tray 10 which can be housed in the cut-away portion 9a and expanded as shown by a dashed line is arranged at the cut-away portion 9a. The width of the paper discharge tray 9 can be adjusted depending upon sizes of printed papers P discharged. An operation panel 14 is located on the top of a front, left side, frame 1a of the body 1, which is positioned to the left of the recess 6. A cassette 7, in which sheets of non-printed paper are housed, is inserted into a cassette housing section 8 at the front lower portion of the body 1. A tray 15 for manually feeding sheets of paper into the body 1, which can be detached from the body 1, is attached to the back of the body 1.

The operation panel 14 includes a liquid crystal display for displaying the number of paper sheets being copied, operation modes under which the image forming operation is undertaken, guide messages and the like; an LED display for displaying various states under which the apparatus is being operated or the image forming operation is being carried out by means of LEDs; and switches for indicating how the apparatus is operated. The switches comprise menu, value and ten numerical keys.

As shown in FIG. 2, paired conveying, aligning and conveying rollers 30, 31 and 32 are arranged upstream of an image transfer section 28 on a paper sheets conveying path 29, while a fixing means 33 and a paper sheet discharge roller unit 34 are located downstream of the image transfer section 28. The discharge roller unit 34 comprises lower and upper rollers 50 and 51. Arranged in the direction in which the paper sheet P is conveyed through the roller unit 34 is an electricity-erasing brush 52 contacting that side of the paper sheet P on which no image is formed. A cooling fan 35 is located above the paired conveying rollers 32 and a conveying guide 37 is arranged above the image transfer section 28. An aligning switch 36 is located adjacent to the paired aligning rollers 31, 31a and a paper sheet discharge switch 322 is located adjacent to the paper sheet discharge roller unit 34 to detect the paper sheet P conveyed. An engine control substrate 2, on which an engine control circuit is mounted to control electric means in the body 1 to finish the electrophotographing process, is arranged under the paper sheet discharge roller unit 34. A printer control substrate, on which a printer control circuit is mounted to control the operation of the engine control circuit, is located in a substrate housing section (not shown) at a lower front portion of the body 1.

A top cover 60 which can be opened and closed is arranged at a freely open space 3 on the top of the body 1, and the upper roller 51 of the paper sheet discharge roller unit 34 is attached to the inner side of the top cover 60 together with the transfer unit 24, conveying guide 37 and electricity-erasing brush 52. The top cover 60 can be swung upward about a rod 61 which is attached to the back-side top of the body 1 about 120 degrees at maximum.

When the top cover 60 is swung upward, the upper roller 51 is pulled out of the open space 3 of the body 1 together with the image transfer unit 24, conveying guide 37 and electricity-erasing brush 52. The most part of the paper sheet conveying path 29 and the most means of an electrophotographing process unit located under the paper sheet conveying path 29 are thus exposed and this makes it easier to remove any jammed paper sheets, maintain these units and exchange them for new ones.

When an image forming operation is carried out, a photosensitive drum 20 is rotated while keeping the surface potential of the photosensitive drum 20 certain by means of a pre-exposing unit 26. The drum 20 is uniformly charged by a charger unit 21 and scanned and exposed by a laser beam a emitted from a laser emitting or exposing unit 22 to form an electrostatic latent image on the photosensitive drum 20 in response to image signals supplied. The electrostatic latent image formed on the photo-sensitive drum 20 is developed by a developing unit 23 which uses two-component developer D consisting of toner (t) and carrier (c), and the toner image thus made visible on the drum 20 is sent to the image transfer section 28.

The paper sheet P picked up from the paper sheet cassette 7 or manually inserted from the tray 15 synchronous with the toner image forming operation is fed into the apparatus through the paired aligning rollers 31, 31a and the toner image previously formed on the photosensitive drum 20 is transferred onto the paper sheet P by means of the image transfer unit 24. The paper sheet P is then guided on the conveying path 29 by the conveying guide 37 and sent to the fixing unit 33 where the toner image which has been transferred is fixed on the paper sheet P. Thereafter, the paper sheet P is discharged to the paper sheet discharge area 6 through the paper sheet discharge roller unit 34.

Toner remaining on the photosensitive drum 20 after the toner image is transferred onto the paper sheet P is electrostatically attracted and removed by a memory removing device 25 which is an electroconductive brush. Small amount of toner uniformly remained on the surface of the photosensitive drum 20 may be further mechanically and electrostatically removed by the developing means 23. As shown in FIG. 2, the fixing device 33 includes a heat roller 41 in which a heater lamp 40 is housed, and a pressure roller 42 pressed against the heat roller 41. The toner image is melted and fixed on the paper sheet P while the paper sheet P is passing through the rollers 41 and 42.

The heat and pressure rollers 41 and 42 are enclosed by lower and upper casings 43 and 44 to allow heat generated by the rollers 41 and 42 to be kept as large as possible so as to guarantee the optimum temperature and atmosphere around them, as needed to completely fix the toner image on the paper sheet P.

A cleaner 45 contacts the heat roller 41 to clean up the surface of the heat roller 41 so as to completely fix the toner image on the paper sheet P. The surface temperature of the heat roller 41 is detected by a thermistor 46 to keep the temperature at such a value as needed to completely fix the toner image on the paper sheet P.

A paper sheet guide 48 is located in the upper casing 44 adjacent to and upstream of a contact point 47 between the heat roller 41 and the pressure roller 42, to reliably guide the front end of the paper sheet P, which has been introduced to the fixing unit 33, between the heat roller 41 and the pressure roller 42. A paper sheet guide 49 integral to the lower casing 43 is located on an exit side of the fixing unit 33 from which the printed paper sheet P is fed to the paper sheet discharge roller unit 34.

The main component units or sections for carrying out the electrophotographing process will be described in detail.

As shown in FIGS. 2 and 3, the laser exposing unit 22 comprises a semiconductor laser 90 (not shown in detail), a polygon scanner 93 including a polygon mirror 91 and a mirror motor 92, a first lens 94 for $f\theta$, a second lens 95 for $f\theta$, reflector mirrors 96, 97 for allowing the laser beam a to scan a certain area and the like. When the paper sheet cassette 7 is pulled out forward, the laser exposing unit 22 can be, from below, attached into and detached from spaces 99 and 100 formed at a base 98 on the top side of the cassette housing section 8 and at the bottom of the body 1. A scanner control substrate 101 is provided to control the semiconductor laser 90 and the mirror motor 92 and to receive signals applied from a laser beam detecting sensor 312 (see FIG. 4) for detecting the laser beam a. The substrate 101 is arranged in the laser exposing unit 22 and connected to the engine control substrate 2 through a connector 102.

Further, the laser exposing unit 22 is housed in casing 103 which has an open bottom at the bottom side thereof and which is made of synthetic resin, and the open bottom of the casing 103 is closed by a shield plate 104 made of metal, while a reinforcing shield cover 105 made of metal is located on the top of the casing 103. A conductive contact 106 is connected to the shield cover 105 and when the laser exposing unit 22 is attached to a certain position in the body 1 by an attaching means (not shown), the contact 106 is contacted with metal-made guide rails which are intended to freely and slidably guide the developing unit 23. Therefore, the unit 22 can be prevented from malfunctioning caused by electrostatic influence added to the unit 22 from the charging unit 21 and the like.

The photosensitive drum 20 is an organic photoconductor mounted on an aluminium cylinder. The organic photoconductor includes a charge generating layer formed on the surface of the cylinder and a charge transporting layer formed on the charge generating layer.

In order to make the electrophotographing process simpler, the developing unit 23 uses the reversal developing method wherein toner (t) remaining after the image transfer step is removed while carrying out the developing step. As shown in FIG. 2, the developing unit 23 includes a casing 121 provided with a developer housing section 120, the photosensitive drum 20 and a developing roller 122 opposed to the photosensitive drum 20, both of which are arranged in the casing 121. The two-component developer consisting of the toner t (coloring agent) and the carrier c (magnetic powder) is housed in the developer housing section 120. A doctor 124 for defining the thickness of a magnetic brush D' which is formed on the surface of the developing roller 122 is located at that portion facing the photosensitive drum 20 which is upstream the magnetic brush D' rubbed against the photosensitive drum 20 at a portion corresponding to a developing position 123. Further, first and second developer stirring members 125 and 126 ar housed in the developer housing section 120.

The developing roller 122 comprises a magnetic roller 130 provided with three magnetic poles 127, 128 and 129, and a non-magnetic sleeve 131 fitted onto the magnetic roller 130 and rotated clockwise in FIG. 2. Of these three magnetic poles 127, 128 and 129 of the magnetic roller 130, poles 127 and 128 opposed to the developing position 123 are of N type and the third pole 129 is of S type. The angle $\theta 1$ of the magnetic pole 127 relative to the magnetic pole 128 is set at 150° and $\theta 2$ of the magnetic pole 128 relative to the magnetic pole 129 is set 75° (see FIG. 2).

The toner (t) remaining on the photosensitive drum 20 can be mechanically and electrically collected at the same time when the electrostatic latent image on the photosensitive drum 20 is developed due to the mechanical cleaning force created by the magnetic brush D' which is seen when the two-component developer D is used and due to potential difference between potential charged by the reversal development and developing bias applied to the magnetic brush D'.

Further, the photosensitive drum 20, charging unit 21, memory erasing unit 25 and the like are incorporated into the developing unit 23 to form the electrophotographing process unit.

The arrangement of the engine control section will be described.

FIG. 4 is a block diagram showing the main portion of the electric circuit of an engine control section 300 and FIG. 5 is a block diagram showing the engine control circuit 2. Reference numeral 302 denotes, a power source unit for the image forming apparatus. When a main switch 301 is turned on, voltages of +5 V and +24 V are output. A voltage of +5 V is supplied to the engine control circuit 2 and further to the printer control circuit 4 connected to the engine control circuit 2. On the other hand, another voltage of +24 V is supplied to cover switches 303 and 304 successively and further supplied to the engine control circuit 2 and then to the scanner control circuit 101, a high voltage power source 305 and a mechanical member drive circuit 306 to be used as a drive power source for the semiconductor laser 90, mirror motor 92, high voltage power source 305, exposing unit 26, a main motor 307, cassette paper sheet supply solenoid 308, manual paper sheet supply solenoid 309, a aligning solenoid 310, a toner replenishing solenoid 311, cooling fan 35 and so on.

A heater lamp drive circuit of the zero cross switch type (not shown) comprising a photo Triac coupler and a Triac to drive the heater lamp 40 is arranged in the power source unit 302 and the voltage of +24 V is used as the drive power source for a light emitting LED of the photo Triac coupler. When the light emitting LED is turned o and off in the heater lamp drive circuit having the above-described arrangement, the light receiving photo Triac is turned on and off at the zero cross point of an AC power source, as well known. The Triac, which is a main switch element at a next stage, is thus turned on and off to connect and disconnect the heater lamp 40 to and from the AC power source. Heater control signal 318 for switching on and off the light emitting LED is supplied from the engine control circuit 2 to the power source means 302, and the thermistor 46 in the fixing unit 33 is connected to the engine control circuit 2.

The cover switch 303 is switched off when the top cover 60 is swung upward (opened) and the other cover switch 304 is switched off when a rear cover (not shown) is opened. When the top or rear cover is opened, therefore, the voltage of +24 V is shut off by the switch 303 or 304. The semiconductor laser 90, mirror motor 92, high voltage power source 305, main motor 307, solenoids 308 through 311, cooling fan 35, heater lamp 40 and the like are thus made inoperative, thereby allowing the operator to touch any of the components inside the body 1 without electrical or mechanical injury.

In FIG. 5, a CPU 350 is provided to control the whole of the engine control section 300, in response to a control program stored in a ROM 351. A RAM 352 is used as a working buffer for the CPU 350. An $E^2PROM$ 353 stores data representing the total number of paper sheets to be printed, the number of paper sheets printed since the electrophotographing process unit 85 was replaced with a new one, and the like. A printer control circuit interface 354 is provided to send an interface signal 317 to and from the printer control circuit 4 therethrough. A laser modulation control circuit 355 is provided to periodically and forceably light the semiconductor laser 90, to generate a laser beam detecting signal, which will be described later, and to modulate the output of the semiconductor laser 90 responsive to image data applied from the printer control circuit 4 in accordance with the interface signal 317. The laser modulation control circuit 355 applies laser modulating signal 314 to the scanner control circuit 101. An output register 356 is provided to output control signals 313, 316, 318 and 319 to control the system or mechanical section drive circuit 306, scanner control circuit 101, high voltage power source 305 and the heater drive circuit. Voltage signals generated by the thermistor 46 and a toner sensor 324 are applied to an A/D converter 357 where the analog signals are converted to digital signals.

The system drive circuit 306 includes drive circuits for driving the motor and solenoids which are turned on and off by two values of 1 and 0 of the control signal 313 applied from the output register 356 so as to supply and shut off the voltage of +24 V to the exposing unit 26, main motor 307, solenoids 308 through 311 and cooling fan 35. The scanner control circuit 101 includes a circuit for driving the semiconductor laser 90 and mirror motor 92, wherein the semiconductor laser 90 is switched on and off responsive to 1 and 0 pulses of the laser modulating signal 314 applied from the laser modulation control circuit 355 and the mirror motor 92 is switched on and off responsive to 1 and 0 of the control signal 319 applied from the output register 356. Further, a laser beam detecting sensor 312 includes a PIN diode and when the laser beam a passes through the laser beam detecting sensor 312, current proportional to the energy of the laser beam flows to the diode. This current is converted to a voltage and amplified through the scanner control circuit 101. The voltage thus amplified is applied, as the laser beam detecting signal 315, to the laser modulation control circuit 355. Furthermore, high voltages 305a, 305b, 305c, 305d and 305e are applied from the high voltage power source 305 to a section 140 for supplying the developing bias voltage, a section 141 for supplying a voltage to the memory eliminating unit, a section 142 for supplying a voltage to the charging unit, a section 197 for supplying a voltage to the grid of the transfer means 24 and a section 198 for supplying a high voltage to the wire. These components are switched on and off responsive to 1 and 0 of the control signal applied from the output register 356.

As described above, electric power is supplied to each of the electric circuits through the engine control circuit 2 and these electric circuits are controlled by a binary signal of 0 and 1 applied from the engine control circuit 2 in the engine control section 300. This engine control section 300 is coupled with a printer control section 400, which will be described later by the interface signal 317.

Horizontal synchronizing signal HSYNCO is generated synchronizing with the laser beam detecting signal applied from the laser exposing unit 22 at every scanning operation. The number of scanning lines corresponds to the effective printing length of the paper sheet P in the paper sheet conveying direction after VSYNC command is received A video clock VCLKO is a synchronous clock to input video data (or image data) VDO which corresponds to one scanning line to the engine control circuit 2, following the horizontal synchronizing signal HSYNCO. The video clock VCLKO is supplied to the engine control circuit 2 by the number of lines as correspond to the effective printing width of the paper sheet P in the horizontal scanning direction. The video data VDO is received by the engine control circuit 2, synchronizing with the falling of the video clock VCLKO, and recorded as a latent image on the photosensitive drum 20 by the laser exposing unit 22. When the video data VDO is zero, it is made visible as a dot image on the paper sheet P.

Figure 7:
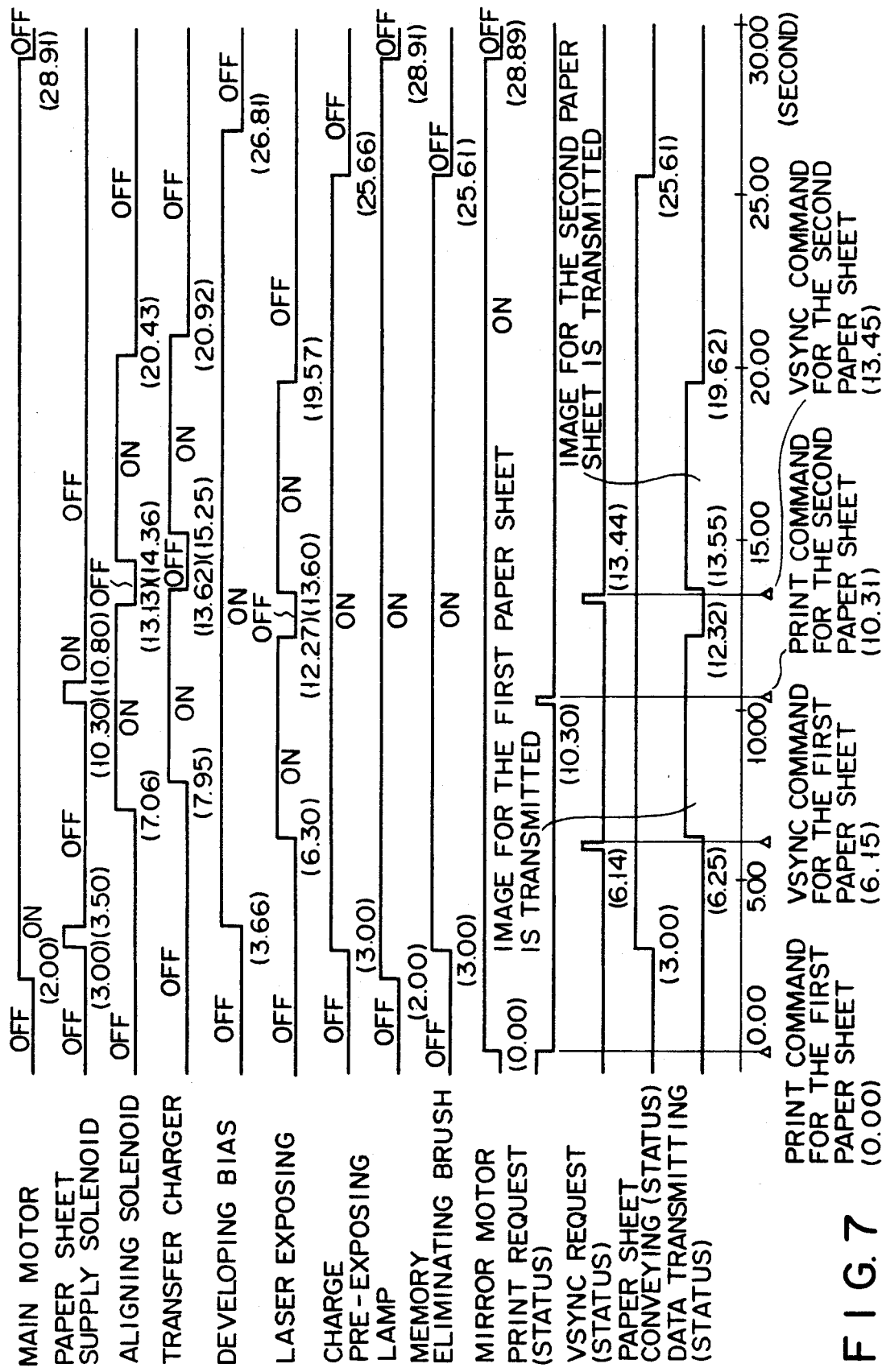
FIG. 7 is a timing chart for the engine control section shown in FIG. 4.

The operation of the engine control section 300 having the above-described arrangement will be described referring to flow charts shown in FIGS. 6A through 6E and a timing chart shown in FIG. 7.

When the main switch 301 is switched on, a reset signal (not shown) is generated, synchronizing with the rising of +5 V, to make the engine control circuit 2 reset, while this reset signal causes a reset signal SCLR1 to be applied to the printer control circuit 4 to make it reset. After the lapse of 200 to 500 msec since +5 V rises, values of the reset signals are reversed to release the circuits from their reset state and the CPU 350 starts to execute a program stored in the ROM 351.

Data in the RAM 352 and the like is initialized (Step S50) and the state of each of the switches is fetched to the input register 358 to check operator calls which indicate that a paper sheet is jammed, that a cover is open, that the process unit is not set yet, the paper supply is empty and so on (Step S51). When the operator calls are present, it is checked whether or not only the call of paper empty is present (Step S52) and when the operator calls, except for the paper empty, are present, the process is returned to the step S51, waiting there until the operator calls are released. When only the operator call of paper empty is present (Step S52) or no operator call is present at the step S51, the heating of the fixing unit 33 is started (Step S53) and the main motor 307 and pre-exposing unit 26 are made operative to initialize the electrophotographing process (Step S54). The charging voltage 305c and memory erasing voltage 305b are supplied (Step S55) and the developing bias voltage 305a is supplied at a time interval determined by the program (Step S56). It is checked in this state whether or not a certain time (about 30 sec) has passed by (Step S57), and it is checked until the time has passed by whether or not the operator call of cover open is present (Step S90). When the operator call of cover open is presented, outputs which have been turned on at the steps S53 to S56 are turned off (Step S91) and the process is again returned to the step S51. When it is recognized that the certain time has passed by at the step S57, the charging voltage 305c and memory erasing voltage 305b are turned off (Step S58), and the developing bias voltage 305a is turned off (Step S59) and the main motor 307 and preexposing unit 26 are made inoperative successively at a timing determined by the program (Step S60). The warming-up of the image forming apparatus is finished by a series of these operations conducted at the steps S53 to S60. Ready signal PRDYO is outputted (1→0) and print request is set at data buses D0 to D7 while attention signal ATN1 is generated (0→1) to make the apparatus ready for carrying out the printing operation (Step S61). The fixing unit 33 heated at the step S53 has become ready to carry out its fixing operation until the process comes to the step S61. When the operator calls are presented, their contents are applied, as an operator call status, to the data buses. On the other hand, the printer control circuit 4 generates an attention reset command to reset the attention signal ATN1 to 0 and, when the status on the data buses is read in the above-described manner, the print request can be recognized. The processes of resetting the attention reset command and the attention signal ATN1 (1→0) and the operation of printing the second sheet of paper are omitted in FIGS. 6A to 6E.

It is checked whether or not the print command is received (Step S62) and when no print command is received, it is checked whether or not the operator calls are presented (Step S92). When the operator calls are presented, the print request is canceled and the operator call status is set while the ready signal PRDYO is made 1 (Step S94). It is checked whether or not the operator call of cover open of these ones is presented (Step S95) and when the operator call of cover open is present, the process is returned to the step S51. When the operator call of cover open is not present, the process is returned to the step S92, waiting there until this operator call is released. When no operator call is presented at the step S92, it is checked whether or not the ready signal PRDYO is 0 (Step S93) and when this signal is 0, the process is returned to the step S62, waiting there for the print command. When the signal is 1, the process is returned to the step S61 because the apparatus has not been made ready, and the apparatus is thus at the ready state again. The flow of the steps S62—S92—S93—S62 shows the apparatus waiting for the print command or kept in the standby state.

When the print command is received at the step S62, the print request is reset to carry out a series of the printing operations. As shown in FIG. 7, the mirror motor 92 is switched on (Step S63), and the main motor 307 and pre-exposing unit 26 are made operative (Step S64), the charging voltage 305c, memory erasing voltage 305b and cassette paper sheet supply solenoid 308 are turned on while "on the way of conveying the paper sheet" of the fundamental status is set (Step S65), the developing bias voltage 305a is turned on (Step S66) and the cassette paper sheet supply solenoid 308 is turned off (Step S67), successively at a time interval determined. The paper sheet supply roller 27 is once rotated during the time when the cassette paper sheet supply solenoid 308 is turned on, and the paper sheet P picked up from the paper sheet cassette 7 is conveyed to the paired aligning rollers 31 via the paired conveying rollers 32 on the paper sheet conveying line 29. After a lapse of a certain time period since the paper sheet P has been fed to the paired aligning rollers 31, it is checked whether or not the aligning switch 36 is switched on (Step S68) and when it is not switched on, it is decided that the paper sheet P does not reach the paired aligning rollers 31 and the process is to be treated as being jammed by the paper sheet P. Namely, the operator call status (of paper sheet jam) is set and the ready signal PRDYO is made 1 (Step S96).

Further, the units which have been turned on at the steps S63 to S66 are successively turned off at a timing determined by the program (Step S97) and the process is returned to the step S68, waiting there until the operator call of paper sheet jam is released. When the aligning switch 36 is switched on at the step S68, the VSYNC request is set and the attention signal ATN1 is generated (0→1). It is checked whether or not the VSYNC command is received (Step S70). When it is received, the VSYNC request is reset and a state, "on the way of transmitting data" is set, while laser exposure is started. The reception of the video data VDO is started while sending the horizontal synchronizing signal HSYNCO and video clock VCLKO, and an image pattern responsive to the video data VDO is exposed on the photosensitive drum 20 (Step S71). The paired aligning rollers 31 are left stopped till the step S71 and the paper sheet P is thus stopped with its front end reached the paired aligning rollers 31. After the lapse of a certain time period, therefore, the aligning solenoid 310 is turned on (Step S72) and the paired aligning rollers 31 starts its rotating to convey the paper sheet P to the image transfer section 28. The aligning solenoid 310 is turned on at such a timing that the front end of the image whose exposure is started on the photosensitive drum 20 at the step S71 is aligned with the front end of the paper sheet P. And the transfer grid voltage 305d and transfer voltage 305e are supplied at such a timing that the front end of the paper sheet P reaches the image transfer section 28 (Step S73). A toner image formed on the photosensitive drum 20 by the developing unit 23 is transferred onto the paper sheet P thus conveyed by the transfer unit 24 at the image transfer section 28. Further, When a timing at which the rear end of the paper sheet P completely comes out of the paper sheet cassette 7 and the next paper sheet can be fed is set, the print request for the second paper sheet is set and the attention signal ATN1 is generated (0→1) (Step S74). On the other hand, after the lapse of a certain time period since the paper sheet P has been fed through the paired aligning rollers 31, it is checked whether or not the paper sheet discharge switch 322 is switched on (Step S75). When it is not switched on, it is decided that the front end of the paper sheet does not reach the paper sheet discharge roller unit 34. The print request is thus reset and the operator call status (of paper sheet jam) is set while the ready signal PRDYO is made 1 (Step S98). The units which have been turned on till the step S74 are successively turned off (Step S99) and the process is returned to the step S92. When the paper sheet discharge switch 322 is switched on, the process waits until the image data which has begun to be received at the step S71 is received to correspond to that of one page of the paper sheet (Step S76). When the reception of the image data is finished, the state "on the way of transmitting data" is reset and the attention signal ATN1 is generated (0→1) (Step S77). The aligning solenoid 310 is turned off at a timing at which the rear end of the paper sheet P passes through the paired aligning rollers 31 (Step S78), and the paired aligning rollers 31 are stopped. Further, the transfer grid voltage 305d and transfer voltage 305e are disabled at a timing at which the rear end of the paper sheet passes through the image transfer section 28 (Step S79). After the lapse of a certain time period since the aligning solenoid 310 has been turned off, it it checked whether or not the paper sheet discharge switch 322 is switched off (Step S80). When it is not switched off, it is decided that the rear end of the paper sheet P does not pass through the paper sheet discharge roller unit 34, and the process is branched to the step S98 to treat the paper sheet jammed. When the switch 322 is switched off, it is decided that the paper sheet P is normally discharged through the roller unit 34, and "on the way of conveying the paper sheet" is reset while the memory erasing voltage 305b is disabled (Step S81). Then, the charging voltage 305c is disabled (Step S82), the developing bias voltage 305a is disabled (Step S83), the mirror motor 92 is made inoperative (Step S84) and the pre-exposing unit 26 and main motor d307 are made inoperative (Step S85). A series of the print operations is thus finished and the process is returned to the step S62 to become on standby.

Figure 8B:
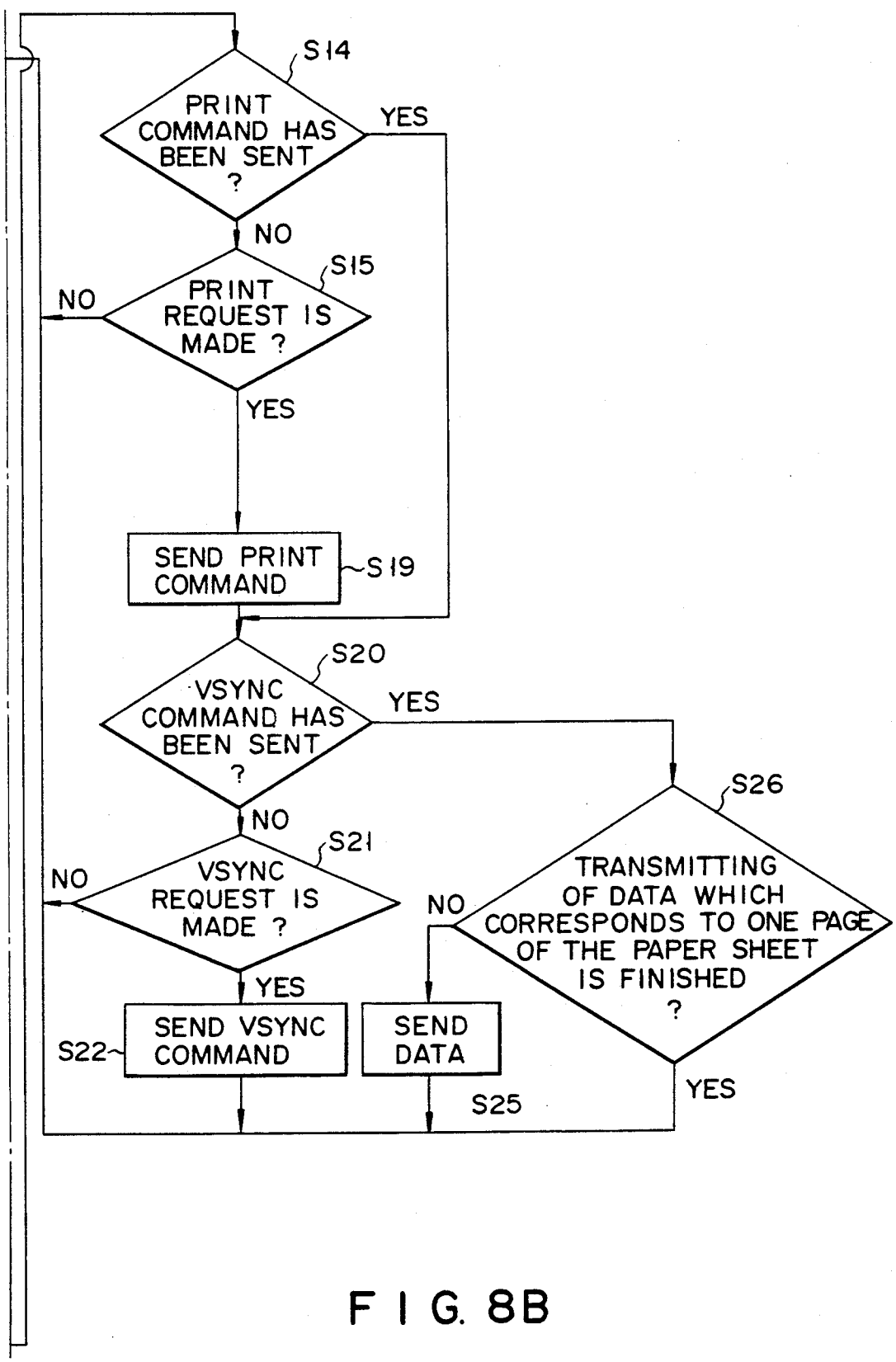

The operation of the printer control circuit section 400 in the order of transmitting data will be described referring to the flow chart shown in FIGS. 8A and 8B.

The image forming apparatus is now under off-state and when it is decided by the CPU 401 that the image forming apparatus is under off-state (Step S1), it is checked whether or not the printing operation is finished responsive to data received from the host unit 409 at the previous process (Step S2), and when it is not finished, the process is branched to a step S12 to continue it. When it is finished, the steps S1 and S2 are repeated to wait until the image forming apparatus is brought under on-state.

When the image forming apparatus is under on-state, it is checked whether or not data sent from the host unit 409 is a command (Step S3). When it is the command, the apparatus is operated responsive to the command (Step S4) but when it is not the command, the command execution step is skipped and the process advances to a step S5. This command is provided to define attributes of data followed and to control the printer without any data sent and received. It is then checked whether or not page buffers arranged in the RAM 403 to receive data are filled with data (Step S5), and when they are not filled with data, it is checked whether or not data sent from the host unit 409 is an image data (Step S6). When it is not the image data, the process is returned to the step S1 and a series of the above-mentioned steps is repeatedly executed to wait until the command or image data is received. When it is found under this state that the image data is received, the image data received is successively stored in the page buffers (Step S7). It is then checked whether or not the storing of the image data which corresponds to one page of the paper sheet is finished (Step S8) and when the storing is not finished, the "data" lamp of the LED display 14b arranged on the operation panel 14 is made flicker (Step S10). The, process is then returned to the step S1, and the series of the above-mentioned steps is repeatedly executed to wait until the image data which corresponds to one page of the paper sheet is stored in the page buffers. When a series of the steps is repeatedly executed and it is decided that the storing of the image data which corresponds to one page of the paper sheet is finished, the "data" lamp is turned off (Step S9) and data receiving process is finished. The process advances to the printing process which will be carried out at a step S12 and those following the step S12. When it is decided at the step S5 that the page buffers are filled with data, data receiving operation is stopped (Step S11) and the process advances to the printing process which will be carried out at the step S12 and those following the step S12. The "data" lamp fickers in this manner during the data receiving operation to tell the operator that the apparatus is receiving data.

When the storing of the image data which corresponds to one page of the paper sheet is finished, it is checked whether or not scan buffers arranged on the video RAM 405 are filled with data (Step S12). When it is decided that the scan buffers are not filled with data, the CPU 401 converts character image data stored in the page buffers to image data and stores it in the video RAM 405 which serves as the scan buffers (Step S13). When the scan buffers are filled with data, the step S13 is skipped.

It is then checked whether or not the print command has been already sent (Step S14) and when it has been sent, the following print command sending processes (Steps S15 to S19) are skipped and the process advances to a step S20. When it is not sent yet, it is checked whether or not the print request is made (Step S15). When it is decided that the print request is not made, it is found that print preparation is not finished on the engine side and the process is returned to the step S1 and a series of the above-mentioned steps is again executed to wait until the print request is made. When it is decided that the print request is made, the print command is sent (Step S19) It is then checked whether or not the VSYNC command has been sent (Step S20). When it is decided that the VSYNC command is not sent yet, it is checked whether or not the VSYNC request is made by the engine side (Step S21). When it is decided that the VSYNC request is not made, the process is returned to the step S1 and it is awaited until the VSYNC request is made, while executing a series of the above-mentioned steps. When it is found at the step S21 that the VSYNC request is made, the VSYNC command is sent to the engine side (Step S22) and the process is returned to the step S1, waiting until the horizontal synchronizing signal HSYNCO and video clock VCLKO are inputted.

When it is decided under this state and at the step S20 that the VSYNC command has been already sent, it is checked whether or not the transmitting of the image data which corresponds to one page of the paper sheet is finished (Step S26) and when this transmitting is not finished, the bit image data stored in the scan buffers is sent to the engine side, synchronizing with the horizontal synchronizing signal HSYNCO and video clock VCLKO (Step S25). On the other hand, the process is returned to the step S1 and the CPU 401 is set to wait the termination of the transmitting of the image data which corresponds to one page of the paper sheet. When this transmitting is finished in this manner, the process is returned to the step S1 and the printer control circuit 4 is initialized to transmit an image data which corresponds to one page of a next paper sheet.

Figure 9:
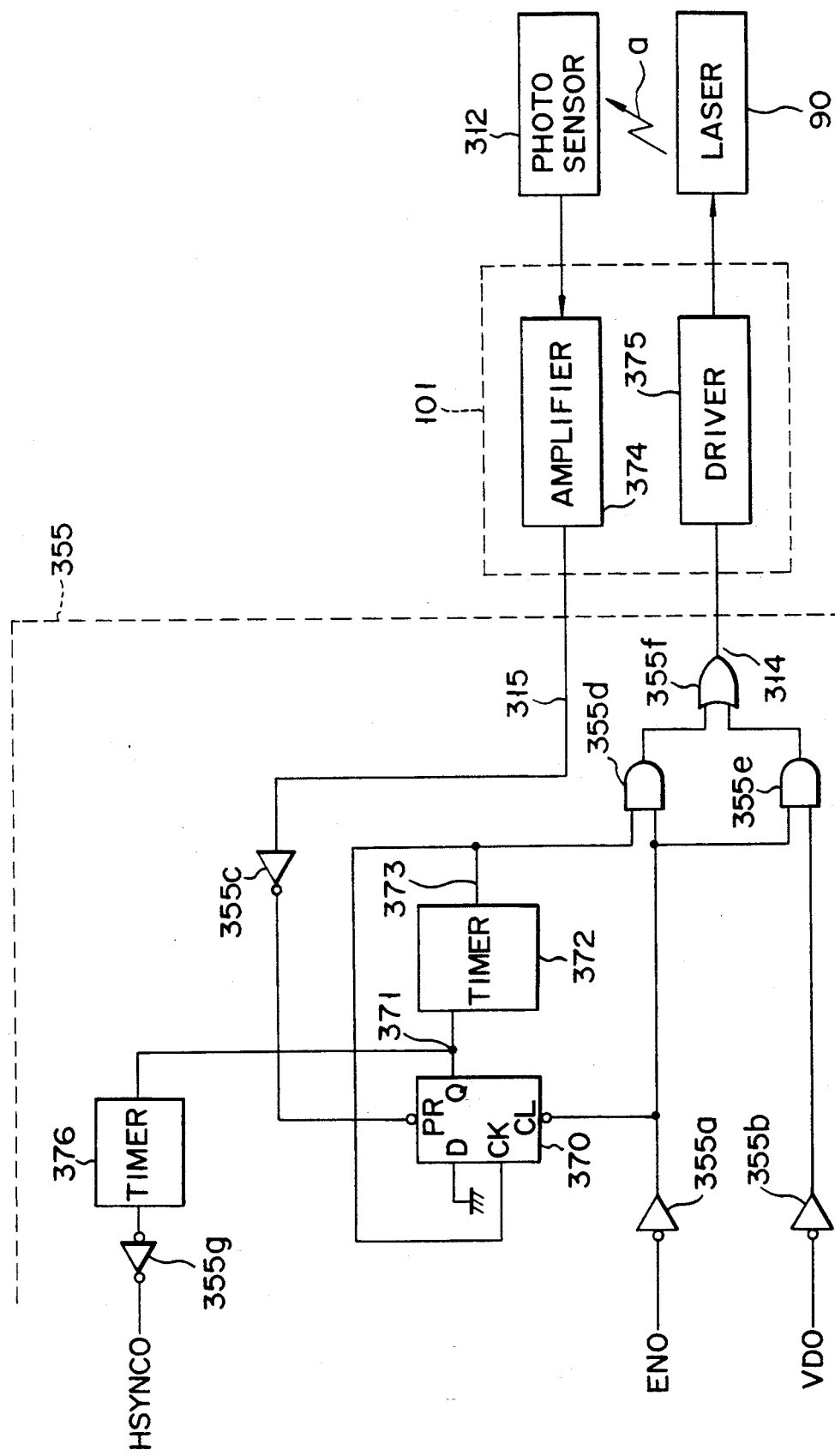
FIG. 9 is a block diagram showing the main portion of a laser modulation control circuit shown in FIG. 5.

FIG. 9 shows an interface section between the laser modulation control circuit 355 and the scanner control circuit 101.

The scanner control circuit 101 comprises an amplifier 374 for amplifying the output of the laser beam detecting sensor 312 provided to detect the laser beam a emitted from the semiconductor laser 90, and a driver 375 for driving the semiconductor laser 90 responsive to the laser modulating signal 314 applied from the laser modulation control circuit 355.

The laser modulation control circuit 355 comprises NOT circuits 355a, 355b, 355c, AND circuits 355d, 355e, an OR circuit 355f, a D type flip-flop circuit 370, timer circuits 372, 376 and a buffer 355g.

Figure 10:
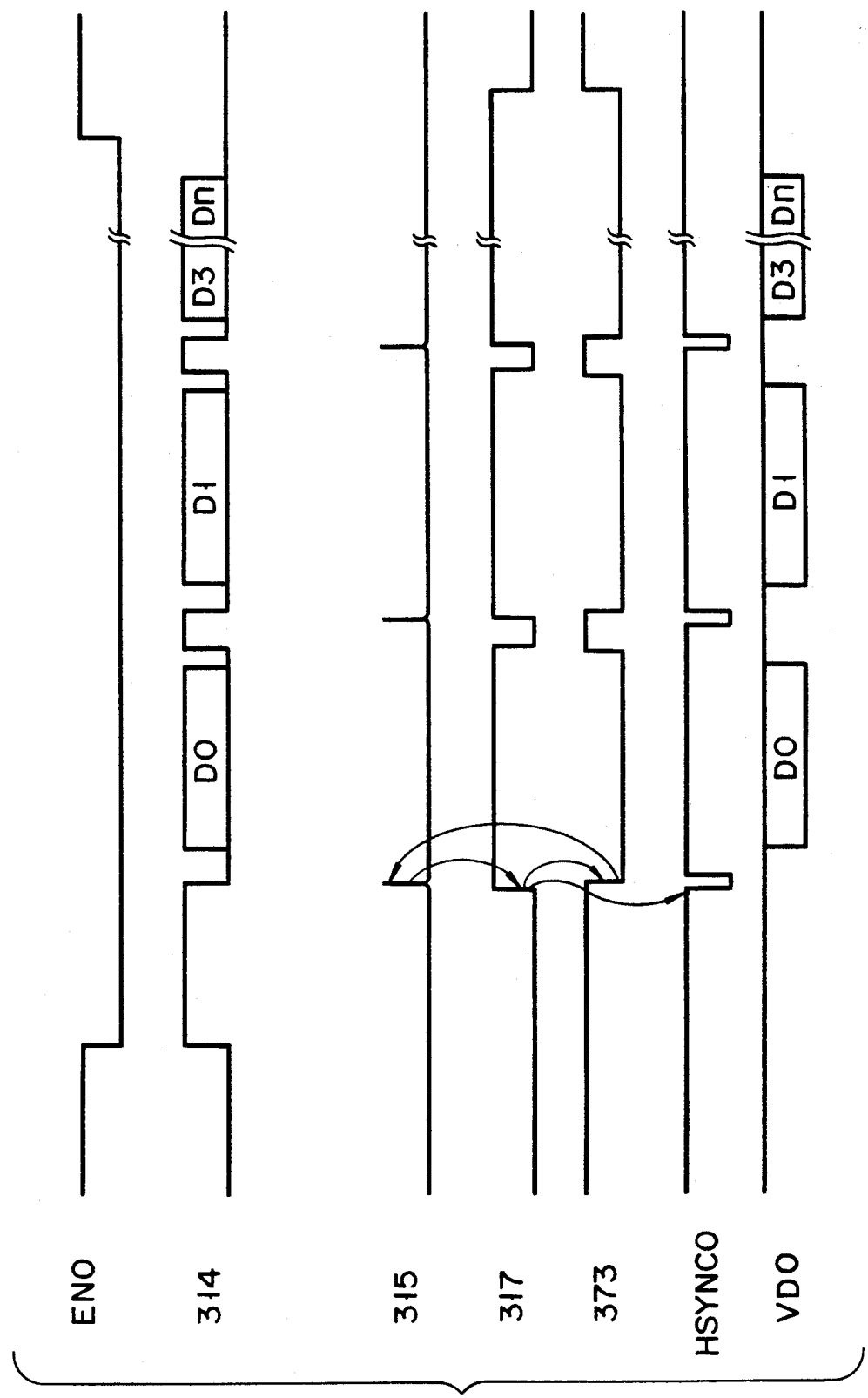
FIG. 10 is a time chart showing an operation of the laser modulation control circuit of FIG. 9.

The operation of the circuits 355 and 101 having the above-described arrangement respectively will be described referring to FIG. 10.

When the mirror motor 92 stably rotates according to a predetermined number of rotations and the value of enable signal ENO output by the CPU 350 is changed from 1 to 0, the value of the laser modulating signal 314 changes from 0 to 1 and the semiconductor laser 90 is turned on by the driver 375 in the scanner control circuit 101. When the laser beam a is detected by the laser beam detecting sensor 312, current proportional to the light energy of the laser beam a flows. This current is converted to voltage and amplified by the amplifier 374 to change the value of the laser beam detecting signal from 0 to 1. The flip-flop 370 is thus preset and the value of its output Q changes from 0 to 1. This output Q is used as a trigger signal 371 for the timers 372 and 376, which start their timer operation for a predetermined time period when the trigger signal 371 rises, and the value of timer output 373 changes from 1 to 0. When the value of the timer output 373 becomes 0, the value of the laser modulating signal 314 changes from 1 to 0, thereby causing the semiconductor laser 90 to be turned off. Even when the laser beam a is passing through the laser beam detecting sensor 312, the value of the laser beam detecting signal 315 changes from 1 to 0 to generate pulse signal.

On the other hand, the output of the timer 376 is sent, as the horizontal synchronizing signal HSYNCO, to the printer control circuit 4 via the buffer 355g. This enables the printer control circuit 4 to use the horizontal synchronizing signal HSYNCO as a trigger signal for sending the image data which corresponds to one line, and further to send the video data VDO (or image data) synchronizing with the video clock applied from the engine control circuit 2. This video data VDO serves as the laser modulating signal 314 to modulate the output of the semiconductor laser 90 and a predetermined image is thus obtained.

When the timer operation of the timer 372 is finished after the lapse of the predetermined time period, the value of the timer output 373 again becomes 1. The value of the laser modulating signal 314 also becomes 1 and the semiconductor laser 90 is forcedly turned on, while the output Q of the flip-flop 370 is reversed and the value of the timer trigger signal 371 becomes 0. The laser beam detecting signal 315 is again generated to continue to repeat the above-described operation and it is decided whether or not a predetermined number of line scans needed to form an image while counting the number of the laser modulating signals 315 generated. When the line scan is made to meet its predetermined number, the value of the enable signal ENO is made 1 and the control of the line scans which correspond to one page of the paper sheet is finished.

While the timer 372 is operating or the value of the timer output 373 is 0, the output Q of the flip-flop 370 does not change even if its preset PR changes, even when the laser beam detecting signal is accidentally generated. Therefore, the whole circuit can be kept not influenced.

As described above, the pulse width of the laser beam detecting signal 315 represents a signal propagating time period beginning from the time when the preset PR of the flip-flop 370 becomes 0 and ending in the time when the value of the laser beam modulating signal 314 becomes 0 at the start time of the timer 372. As shown in FIG. 10, therefore, the laser beam detecting signal 315 becomes a pulse signal like a whisker. However, corresponding to the front edge of the laser beam detecting signal 315, the timer 376 is started to carry out its timer operation for the predetermined time period. In addition, the output of the timer 376 becomes 0 during the timer operation but it becomes 1 when the timer operation is stopped. When this timer output is used as the horizontal synchronizing signal HSYNCO, therefore, the signal HSYNCO can be output to have a certain pulse width even if the laser beam detecting signal 315 is shaped like a whisker.

Figure 11:
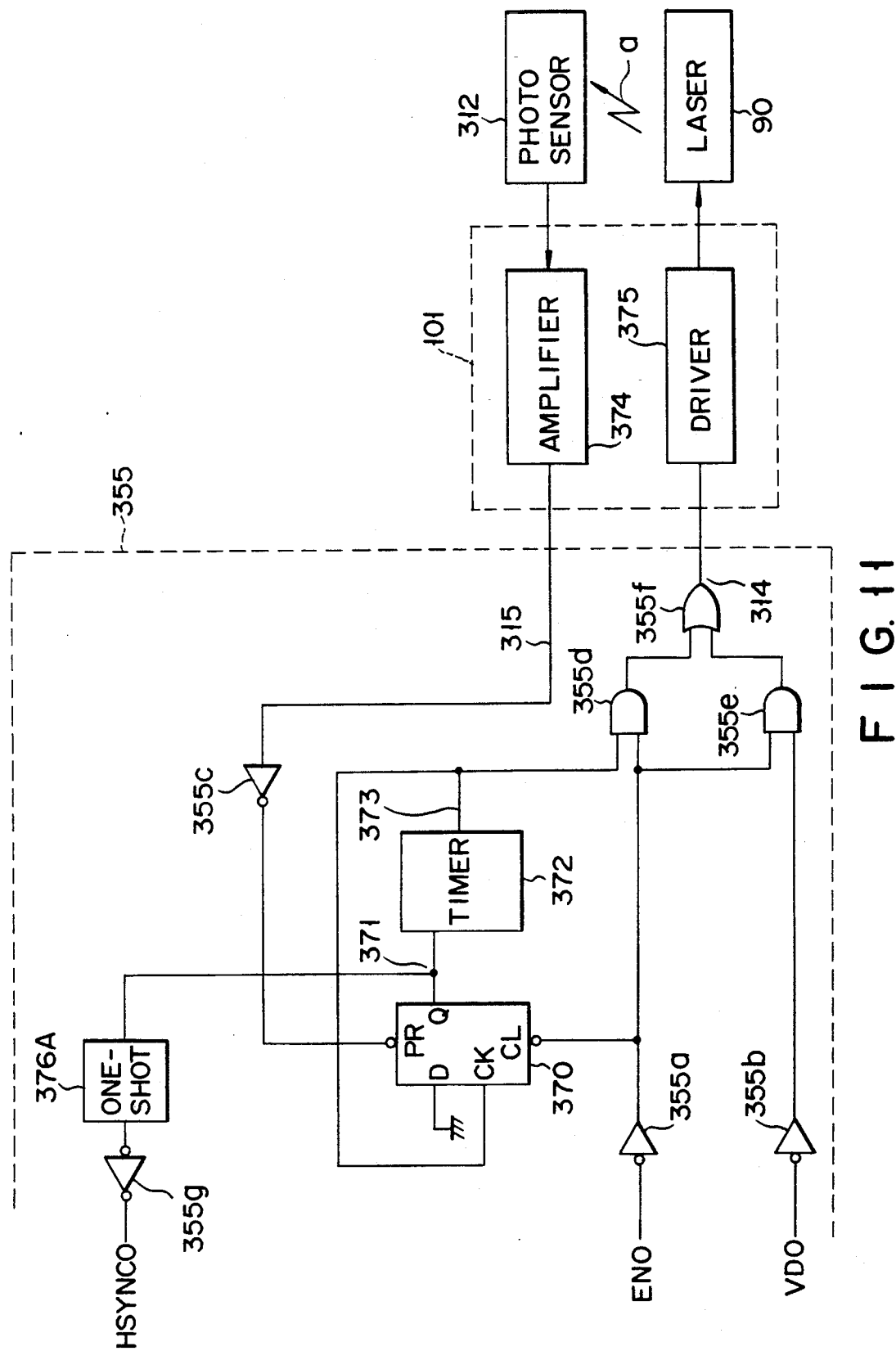

Although the timer circuit 376 has been used to output the horizontal synchronizing signal HSYNCO whose pulse width can be kept certain in the above-described embodiment of the present invention, a one shot circuit 376A shown in FIG. 11 or a counter 376B shown in FIG. 12 may be used instead of the timer 376. The other components shown in FIGS. 11 and 12 are same as those shown in FIG. 9 and description on these components will be omitted accordingly.

According to the present invention as described above in detail, the timer is operated for a predetermined time period, corresponding to the front edge of the laser beam detecting signal periodically generated, while the output of the laser beam is turned off to prevent the timer from being influenced by another laser beam detecting signal during the predetermined time period. When this pulse signal is used as the horizontal synchronizing signal, therefore, the horizontal synchronizing signal can be made stable to have a certain pulse width.

Additional advantages and modifications will readily occur to those skilled in the art. Therefore, the invention in its broader aspects is not limited to the specific details, and representative devices, shown and described. Accordingly, various modifications may be made without departing from the spirit or scope of the general inventive concept as defined by the appended claims and their equivalents.

What is claimed is:

1. An image forming apparatus for forming images on an image forming medium, comprising:
   means for emitting a laser beam;
   means for detecting the laser beam emitted from the emitting means to generate a detecting signal;
   first means for generating, in a first state, a first pulse signal having a front edge, in response to the detecting signal generated by the detecting means;
   means for maintaining said first means in the first state in response to the first pulse signal, so that the first pulse signal is not affected by a subsequent detecting signal; and
   second means for generating a second pulse signal for a predetermined period of time, corresponding to the front edge of the first pulse signal generated by the first means.

2. An image forming apparatus comprising:
   means for emitting a laser beam;
   first generating means for detecting the laser beam from said emitting means to generate a first pulse signal;
   timer means for supplying to said emitting means a stopping signal retaining for a first predetermined period of time since the first pulse signal is generated by the first generating means to cause said emitting means not to generate the laser beam; and
   second generating means for generating a second pulse signal for a second predetermined period of time corresponding to the first predetermined period of time in response to the first pulse signal generated by the first generating means.

3. An image forming apparatus according to claim 2, wherein said first pulse signal generating means includes:
   means for detecting the laser beam to generate a laser beam detection signal; and
   a flip-flop circuit having a preset terminal supplied with the laser beam detection signal to place said flip-flop circuit into a preset state for supplying to said timer means a set output as said first pulse signal in response to the laser beam detection signal, and a clock terminal supplied with an output of said timer means to maintain said flip-flop circuit in the preset state.

4. An image forming apparatus according to claim 2, wherein said timer means includes:
   first and second gate mans respectively having first gate terminals enabled by an external enabling signal;
   a timer for receiving said first pulse signal to output a timer output signal;

means for supplying the timer output signal of said timer to a second gate terminal of said first gate means;

means for supplying to a second gate terminal of said second gate means external image data; and means for supplying outputs of said first and second gate means to said laser beam emitting means.

5. An image forming apparatus according to claim 1, wherein said second pulse generating means includes a timer driven by a front edge of said first pulse signal, to generate a timer output as the second pulse signal after the lapse of the predetermined period of time.

6. An image forming apparatus according to claim 1, wherein said second pulse generating means includes a one-shot circuit for generating, as said second pulse signal, a pulse signal rising in accordance with a front edge of said first pulse signal and falling after the lapse of the predetermined period of time.

7. An image forming apparatus according to claim 1, wherein said second pulse signal generating means includes a counter driven in accordance with a front edge of said first pulse signal, for counting the numbers of counts corresponding to the predetermined period of time to generate a carry signal as said second pulse signal.

8. An image forming apparatus comprising:
means for emitting a laser beam;
means for detecting the laser beam emitted from the emitting means to generate a detecting signal;
first generating means for generating a first pulse signal responsive to the detecting signal generated from the detecting means;
second generating means for generating a second pulse signal responsive to the first pulse signal generated from the first generating means;
timer means for counting a predetermined period of time from the first signal generated from the first generating means; and
means for inhibiting the input of the detecting signal to the second generating means when the timer means is counted the predetermined period of time which corresponds to that of a horizontal synchronizing signal.

9. An image forming apparatus comprising:
means for emitting a laser beam for forming an image on an image forming medium;
means for detecting the laser beam emitted from the emitting means to generate a first laser beam detection pulse signal;
flip-flop circuit means having a preset terminal to which the first laser beam detection pulse signal is supplied, for generating a trigger pulse signal having a front edge in response to the first laser beam detection pulse signal, the flip-flop circuit means being set at a preset state in response to the first laser beam detection pulse signal;
first timer means for generating a horizontal synchronizing signal having a predetermined pulse width in response to the front edge of the trigger pulse signal;
second timer means for generating a timer output signal in response to the front edge of the trigger pulse signal, so that the timer output signal is generated at time of generation of the horizontal synchronizing signal;
means for maintaining the flip-flop circuit means in the preset state in response to the timer output signal, so that the flip-flop circuit means is not affected by a subsequent detecting signal detected by the detecting means according to a subsequent laser beam detection signal following the first laser beam detection pulse signal;
gate circuit means having first and second input terminals, the first input terminal being connected to receive the timer output signal and the second input terminal being connected to receive a laser enable signal, for outputting laser driving signal in response to both the timer output signal and the laser enable signal; and
means for driving the laser beam emitting means to generate the image in synchronism with the horizontal synchronizing signal.

* * * * *